United States Patent

Legler et al.

[15] 3,665,220

[45] May 23, 1972

[54] CROSS-TRACK DISTRIBUTOR FOR VIDEO SIGNALS

[72] Inventors: Ernst Legler, Seeheim an der Bergstrasse; Karl Kirchner, Griesheim bei Darmstadt, both of Germany

[73] Assignee: Fernseh GmbH, Darmstadt, Germany

[22] Filed: July 30, 1969

[21] Appl. No.: 846,033

[30] Foreign Application Priority Data

Aug. 9, 1968 Germany ......................P 17 62 722.4

[52] U.S. Cl. ..............................307/254, 307/256, 307/303, 307/241

[51] Int. Cl. ........................................................H03k 17/00

[58] Field of Search..............178/7.3; 317/101 CX; 307/254, 307/256, 303, 241; 340/166 CR

[56] References Cited

UNITED STATES PATENTS 3,230,397 1/1966 Linder ...................................307/244
3,533,045 10/1970 Henschen........................317/101 CC
3,161,859 12/1964 Medwin et al. ....................307/303 X
3,218,613 11/1965 Gribble et al. .....................307/303 X
3,270,399 9/1966 Ohntrup............................317/101 X

*Primary Examiner*—Donald D. Forrer
*Assistant Examiner*—B. P. Davis
*Attorney*—Michael S. Striker

[57] ABSTRACT

A cross-bar distributor applicable to color television signals, in which a parallel group of conductors serve as input lines to which the input television signals are applied. A second group of conductors cross over or intersect the first group of conductors and serve as output lines from which the output signals are taken. At the cross-over points of the input and output lines, electronic switching circuits are provided with semi-conductor elements and resistors in integrated circuit form. A T network of three diodes is contained within the switching circuit, and a transistor decoupling stage is connected in front of each one of the diodes lying in the longitudinal branch of the T network. The center point of the T network is connected to the tap of a voltage divider which has one branch consisting of a resistor, and the other branch in the form of a resistor connected in series with a switching transistor.

13 Claims, 4 Drawing Figures

Inventors:
Ernst Legler
Karl Kirchner
by
Attorney

Inventors:
Ernst Legler
Karl Kirchner
by
Attorney

Inventors:
Ernst Legler
Karl Kirchner
by
Attorney

CROSS-TRACK DISTRIBUTOR FOR VIDEO SIGNALS

BACKGROUND OF THE INVENTION

The present invention is related to a cross-track distributor used for video signals and, in particular, for color television signals. The distributor is equipped with a first group of parallel lines to which the input signals are applied. A second group of lines or conductors cross the first group of parallel lines or conductors. The output signals are taken from the second group of lines or conductors. Remotely actuated switches are provided at the intersections across points of the lines or conductors between a first and second groups of lines.

A cross-track distributor of this type, of the preceding species, makes possible the interconnection of any one input line with any one or more output lines. In the television technology, the application of such a cross-track distributor is for the selective distribution of different picture transmitters or generators which produce television signals. These television signals may then be transmitted to different output lines through the cross-track distributor. These output lines are applied either directly to the receiver, or through the application of intermediate circuits in the form of television transmitters which transmit the television signals to the receivers.

When applied to the television technology, cross-bar distributors must meet a number of requirements which are not always easily fulfilled. The amplitude and frequency of the output signals are to be always in correspondence with the input signals within substantially small tolerances. This condition, moreover, must prevail independent of a number of output lines which are connected with any one input line. Furthermore, no cross talk is to prevail between the input and output lines, even in the worst operating case as, for example, when one input line only is connected to the signal source and the other input lines have noise signals applied to them.

With the conventional cross-bar distributors, these requirements could be fulfilled, to an extent, for luminance signals corresponding to black-white television. In the application to color television signals, however, these conventional cross-bar distributors can no longer be used, in view of the substantially more severe requirement that are imposed. In color television signals, a high cross talk attenuation is also to be applied within the frequency region of the chrominance signal or the color carrier of the chrominance signal. It is also required, in color television, that the difference in times between the input and output connections of the cross-bar distributor be made so small, that the resulting phase shift of the color carrier does not lead to a noticeable color distortion, even under worse possible operation conditions. Assuming that a phase shift of, for example, three degrees for the color carrier of the color television signal which is to be switched, is permissible, then the time which is dependent upon the position of the cross point which is being switched between input and output of a cross-track distributor, must not differ by more than two ns. This requirement limits, thereby, the dimensions of the switching field of the cross-track distributor which must also not be too large for other reasons as, for example, to permit being built into a standard rack. On the other side, the number of lines, which are to be selectively interconnected through means of a cross-track distributor, are always arranged in stages. In order to maintain the number of cross-track distributors at a minimum, it is desireable to provide for the maximum number of input and output lines in a distribution field.

The object of the present invention is, accordingly, to provide a cross-track distributor which meets all the aforementioned requirements which are imposed upon video signals and in particular upon color television signals. It is the object of the present invention to provide a simple and substantially small structural unit which has a high reliability in operation and will maintain electrical parameters substantially constant.

In accordance with the present invention, a cross-track distributor is provided for video signals and in particular for color television signals, in which a first group of parallel lines have the input signals applied to them. A second group of lines cross or intersect with the first group of parallel lines. The output signals are taken from these second group of lines. Electronic switching arrangements are situated at the cross-over points or intersections of the first and second groups of conductors or lines. In accordance with the present invention, these electronic switching arrangements are made of semiconductor elements and resistances in integrated circuitry.

In a preferred embodiment of the present invention, the cross-track distributor has the electronic switching arrangement in the form of a T network composed of three diodes. The diode which lies in the longitudinal direction of the T network, is preceded by a transistor decoupling stage. The central point of the T network can be advantageously applied to the tap or junction of a voltage divider. The branches of this voltage divider may consist of a resistor or, on the other hand, of a resistor in series with a transistor which operates or functions as a switch.

SUMMARY OF THE INVENTION

A cross-track distributor for television signals in which a first group of conductors intersects or crosses over a second group of conductors in the form of a matrix in which the first and second groups of conductors are arranged parallel to each other. The input signals are applied to the first group of conductors, whereas the output signals are taken from the second group of conductors. An electronic switching arrangement is situated at each of the cross-over points of the first and second groups of conductors for connecting any one of the input lines represented by the first group of conductors, to any one or more of the output lines represented by the second group of conductors. The electronic switching circuit is made of semiconductor elements and resistors combined in integrated circuit form. A T network consisting of three diodes is included within the switching circuit, and a transistor decoupling stage is connected in front of each diode lying in the longitudinal branch of the T network. The center point of the T network is connected to a voltage divider which has one branch in the form of a resistor, whereas the other branch consists of a resistor connected in series with a transistor functioning as a switch.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
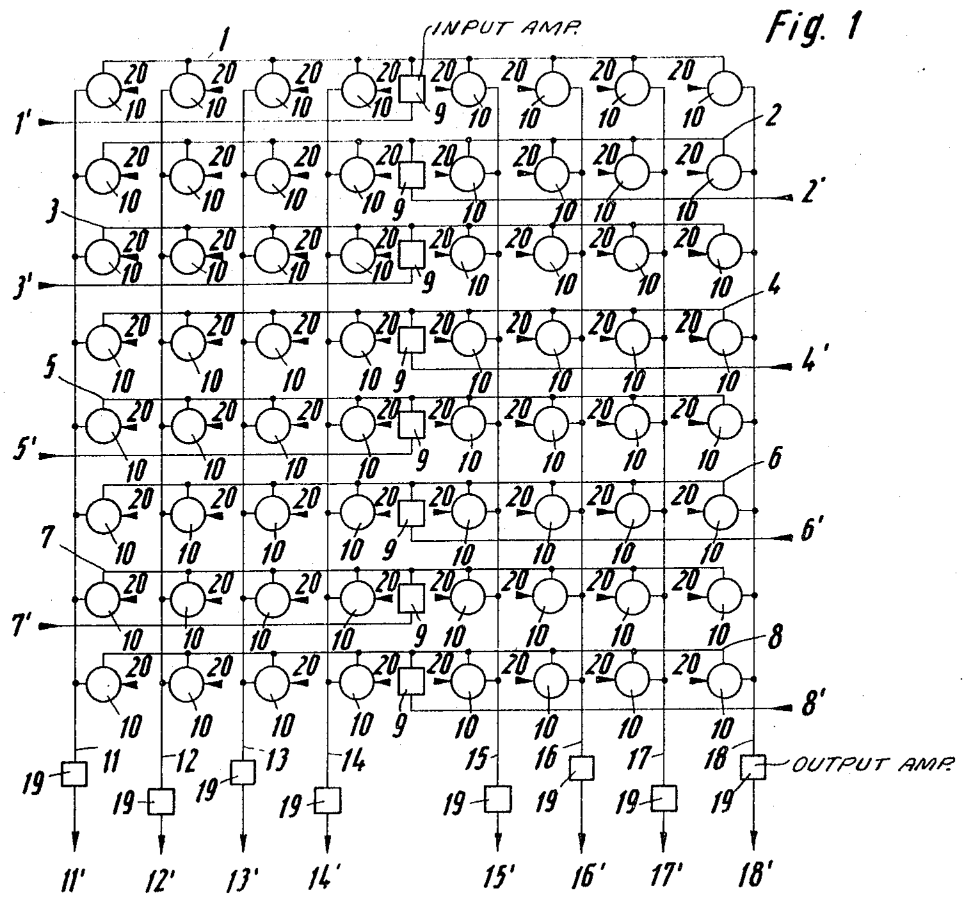
FIG. 1 is a schematic representation of a cross-track distributor, in accordance with the present invention.

The cross-track distributor, in accordance with the present invention, is illustrated in FIG. 1 with only eight input lines and eight output lines for the purposes of simplicity and clarity. The horizontally drawn input lines 1 to 8 have the input signals applied to them through an amplifier 9 provided for each of the terminals 1' and 8'. An electronic switching circuit 10 is arranged at each of the 64 cross points or intersections of the input lines 1 to 8 and the perpendicular or normally-drawn output lines 11 to 18. Through a DC control signal applied to the terminal 20, this electronic switching circuit may be placed into circuit opening or circuit closed state or condition. An output amplifier 19 is provided between each of the output lines 11 to 18 and the output terminals 11' to 18'.

Figure 2:
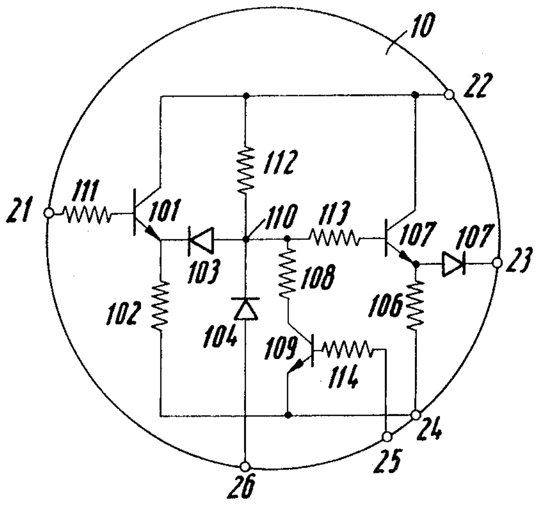
FIG. 2 is an electrical circuit diagram of the switching arrangement, in integrated circuit form, used to interconnect the input and output lines of the cross-track distributor in FIG. 1.

FIG. 2 shows a preferred embodiment of the switching circuit group 10. This switching circuit group contains the transistors 101, 105, 109, three diodes 103, 104, 107, and seven resistors in integrated circuit form. The terminal 21 is the input terminal for the switching circuit group, and this switching circuit group is connected with the input lines 1 to 8 in FIG. 1. The input signal from this terminal 21, reaches the base of the first transistor 101, through a protective resistor 111. This transistor as used in the present embodiment is of the npn type. The cathode of a semi-conductor diode 103 is connected to the emitter of the transistor 101. The emitter of this transistor is also connected to a terminal 24 of the operating current source, by way of a resistor 102. The collector of the transistor, on the other hand, is connected to the other terminal 22 of the operating current source. The anode of the semi-conductor diode 103, is connected to the base of the transistor 105 through the resistor 113. This transistor 105 is also of the npn type. The emitter of this transistor 105 is connected to the anode of a second semi-conducting diode 107 and, at the same time, leads to the terminal 24 of the power supply, by way of the resistor 106. The collector of this second transistor 105 is also jointed directly to the terminal 22 of the operating current source. The cathode of the diode 107 is connected to the output terminal 23 of the switching circuit 10. The latter is connected with the output lines 11 to 18 in FIG. 1. A third semi-conducting diode 104 has its cathode connected to the anode of the semi-conducting diode 103, while the anode of the diode 104 is connected to the terminal 26 to which a suitable bias potential may be applied to the diode. A resistor 112 lies between the anode of the diode 103 and the terminal 22 of the current source. The controlling signal for closing and opening the switching circuit 10 between the input terminal 21 and the output terminal 23, is applied to the terminal 25. This control signal then reaches the base of the third transistor 109, by way of the resistor 114. This transistor 109 is also of the NPN type. The emitter of the transistor 109 is connected to the terminal 24 of the power supply or current source. The collector of this third transistor 109 leads to the junction 110, through the resistor 108. Connected to this junction 110, in addition to the resistor 108, are the anode of the diode 103, the cathode of the diode 104, and one terminal of each of the resistors 112 and 113.

In accordance with a feature of the present invention, the switching circuit described above, in combined form, is arranged as an integrated circuit. As a result of this arrangement, the dimensions of the combined switching elements can be considerably made smaller, so that the cross-track distributor for television signals and in particular for color television signals, may be designed with a large number of intersection points. In this manner, these intersection points may be provided to meet the severe requirements of the inputs. Such integrated circuit may be contained on a substrate or chip of approximately 2 × 2 mm. Such an arrangement or construction does not require more space than the conventional single transistor, even after being mounted within a protective can or capsule. The spacing between the lines of both groups are, consequently, no longer limited through the switching element. Instead, the limitation is based upon the required decoupling and the mechanical design capability. An example of such mechanical design is provided in a subsequent paragraph.

An initial requirement is that the amplitude of the output signals of the cross-track distributor be equal to the input signals thereof. This condition is fulfilled through the feature that the transistors 101 and 105 are connected as emitter followers. As conventionally known in the art, the output voltage taken from the emitter of such a circuit is, substantially, equal to the input voltage applied to the base of the transistor. Furthermore, the tolerances of the transistor characteristics become considerably compensated through the emitter resistance which provides very considerable negative feedback. The absolute magnitude of the emitter resistance, moreover, has substantially no influence upon the relationship between output and input voltage, when considered from a predetermined lower value. The condition that the resistance values in integrated circuitry cannot be maintained to precise values and that considerable tolerances of, for example, 30 percent are incurred, does not affect substantially the transfer function for the amplitude of the signals. Transistors connected in emitter follower circuits function, as known in the art, as impedance converters, and transform or convert the high input resistance or impedance into a lower output impedance at the emitter. This output impedance or resistance is essentially smaller than the resistance of the diode 103, when in the conducting state. The same condition applies to the second diode 107, which is connected to the emitter of the transistor 105.

For the purpose of controlling the diodes 103 and 107 between the non-conducting state and reverse, the potential at the circuit terminal 110 is varied. The control is achieved through the transistor 109, which has its base connected by way of the resistor 114, to the terminal 25 to which the control voltage is applied. When the transistor 109 is transferred to the conducting state, or is turned on, then the potential at the junction or terminal 110 is determined through the voltage divider which is composed of the resistors 112 and 108 between the terminals 22 and 24 of the operating current source. In the embodiment or example illustrated, this junction 110 is thus made more negative and the potential at the emitter of the transistor 101, and as a result of this condition, the diode 103 is cut-off or is non-conducting. The potential of the circuit junction 110 is transmitted to the emitter of the transistor 105, furthermore, so that the diode 107 is also turned-off, provided that the output terminal 23 has a predetermined DC potential applied to it. The diode 104 is, at the same time, in the conducting state, and applies thereby a constant potential from the terminal 26, to the circuit junction 110. In this manner, residual signals which are still transmitted to the circuit junction 110 through, for example, the capacitance of the diode 103, become short-circuited. The current required for the conducting state of the diode 104, is supplied from the negative terminal of the current operating source, by way of the transistor 109 and the resistor 108. In order to establish a circuit closure for the switching circuit, corresponding to establishing a connection between the input 21 and the output 23, the diodes 103 and 107 are transferred to the conducting state. This is accomplished by applying to the terminal 25 a sufficiently high negative voltage so that the transistor 109 is turned-off. A positive voltage is then applied to the circuit junction 110, from the terminal 22 and through the resistor 112, so that the diode 103 becomes conducting. Thus, a sufficiently high voltage is transmitted from the positive terminal 22 of the voltage source, and is applied to the junction 110 by way of the resistor 112, to the extent that the diode 104 is transferred to the conducting state. As a result, the potential at the emitter of the transistor 105 is also increased to the extent that the diode 107 also becomes conducting. The diode 104 is, at the same time, cut-off or turned-off. The DC current flow which prevailed in the conducting state of the diodes and which must, in all cases, be greater than the signal current, is taken from the terminals 22 and 24 of the operating current source.

For the purpose of further illustrating the design and construction of the circuitry, in accordance with the present invention, the dimensions of the preceding active switches, as well as the operating voltages and currents which are pertinent to the switches, are as follows: Resistors 111 and 113 are 250 ohms. Resistor 102 is 2.7 kohms, resistor 114 is 9 kohms, resistor 112 is 3 kohms, resistor 108 is 1.5 kohms. The terminal 26 is connected to ground potential, whereas the terminal 22 is connected to +9 volts. The terminal 24, on the other hand, has −9 volts applied to it. Terminal 25 is also at −9 volts for the establishing a circuit opening of the switch, and is 0 volts for establishing a circuit closure of the switch.

The inputs 21 of all intersecting or cross points of an input line, are preferably connected galvanically with the output of the input amplifier 9. The output resistance of all intersections or cross points at an output line, at the terminal 23, is of the order of 2 kohms.

The input lines 1 to 8 of the cross-track distributor, in accordance with the present invention, become fed with the input signals, through the input amplifiers 9, as shown schematically in FIG. 1. The amplifiers possess a low dynamic output resistance of less than 10 ohms. As a result, these amplifiers deliver a constant output voltage which is independent of the number of output lines that may be connected to an input line through closure of the respective switch 10. This is based from the preceding description, on the condition that the input resistance of the switching circuit is many times the output resistance of the amplifier 9. The input amplifiers can be advantageously connected somewhat at the center of the input lines, as schematically represented in FIG. 1, for the purpose of diminishing the differences in the lengths of the paths. From the viewpoint of space considerations, it is of advantage to arrange end stages at the input amplifiers only when designed in the form of emitter followers between the central output lines. Preamplifiers, furthermore, may be arranged, as required, outside of the actual switching field. When the preamplifiers become situated alternatingly on both sides of the switching field, the amount of available space for them becomes doubled in the direction of the output line.

The output amplifiers 19 are situated at the end of the switching field, and are connected with the output lines. In order to also make available more space for each amplifier, these can also be displaced relative to each other, as shown in FIG. 1.

Figure 3:
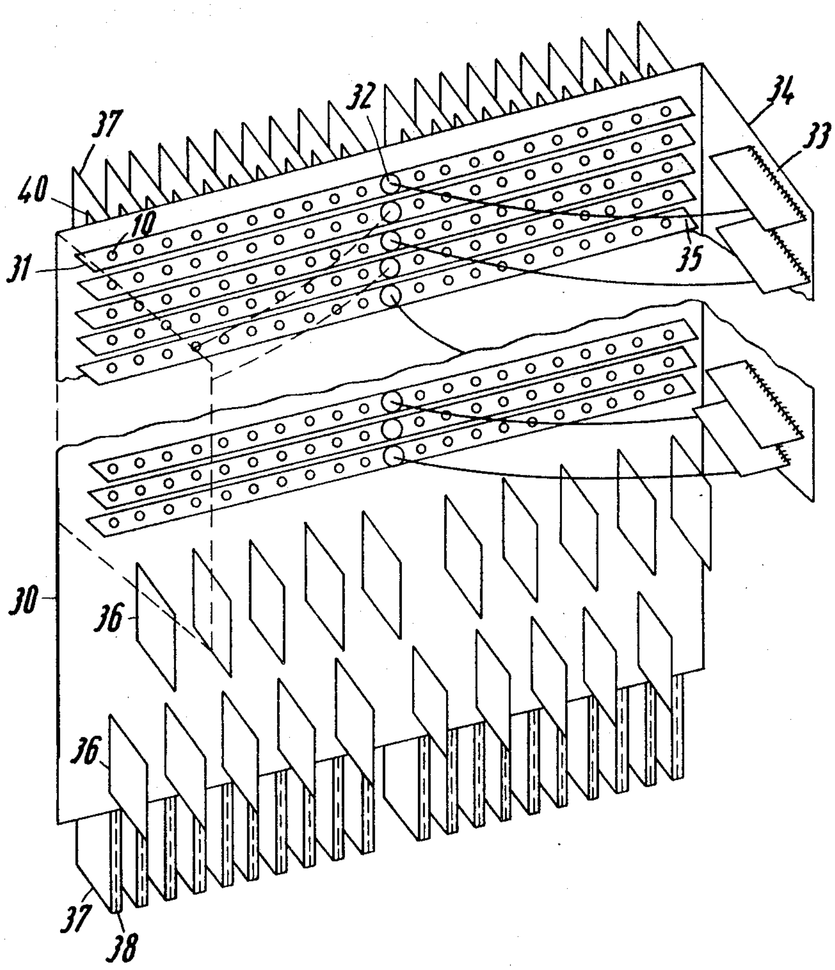
FIG. 3 is a partial isometric view of the construction of a cross-track distributor, in accordance with the present invention.

FIG. 3 shows schematically an embodiment for the construction of the cross-track distributor, in accordance with the present invention. The input and output lines are arranged on both sides of the base plate 30. The input and output lines are arranged in the form of printed circuitry upon stripshaped plates. In FIG. 3, the horizontally directed plates 31 are, for example, connected with the input lines, and the strips 40 on the other side of the base plate 30 are connected with the output lines. The active switches 10 are arranged upon one of the strips, and are preferably upon the strip to which the input lines are connected. The arrangement of FIG. 3 shows a cross-track distributor which, in accordance with the present invention, is designed with 20 output lines and 20 input lines. However, only the first five and the last three of these lines are represented in the drawing. In the center of each strip with the input lines, the end stage 32 of the associated input amplifier is arranged. The output of this amplifier is connected with the respective input line. The front stages of the input amplifier are arranged onto plates 34 which are situated on oppositely lying edges of the base plate, and are perpendicular to this base plate in the direction of the output lines. For purposes of maintaining clarity of the drawing, only the right one of these side plates are shown in the FIG. 3. The end stages 32 of the input amplifier are connected with the front stages 33 through loose cables 35. The output amplifiers 36 are mounted upon the base plate beneath the last (20th) horizontal strip with the input lines. These are also mounted upon circuit boards in the form of printed circuitry, similar to the input amplifiers 33. These circuit boards are secured perpendicular to the base plate 30. To assure that the output amplifiers 36 have sufficient room and are spaced sufficiently apart from each other so that they do not operationally interfere with each other, these amplifiers 36 are arranged alternatingly in two rows, in which one row is beneath the other.

Figure 4:
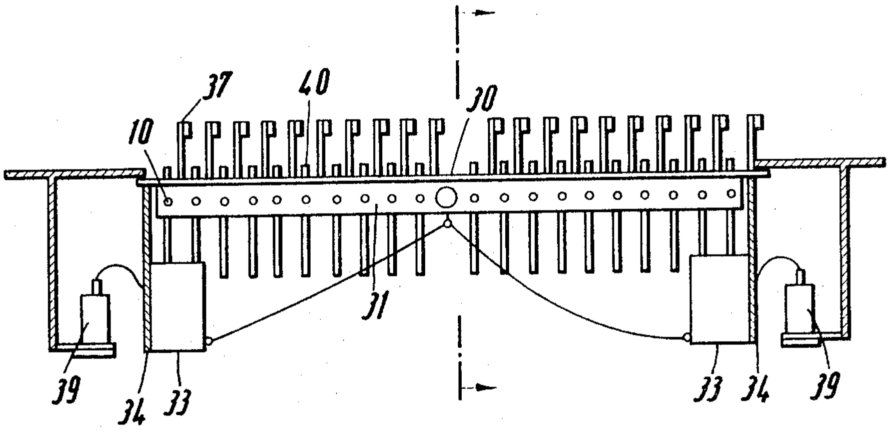
FIG. 4 are sectional views of the cross-track distributor construction of FIG. 3.
Figure 4:
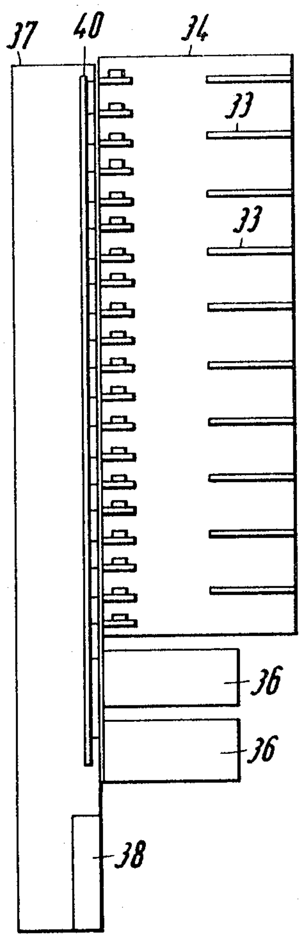

The control lines for each of twenty active switch circuits 10, one below the other, are in the form of printed circuit conductors or cables upon strip-shaped plate 37. These plates 37 are arranged between the strips 32 which the output lines upon the rear side of the base plate 30. The strips 37 project downward along the base plate 30. The control lines as well as the auxiliary conductor tracks on the plates 37 for the current supply of the active switch, terminate in multi-plug connectors 38 at the end of the strips 37. To establish the connection between the input lines and the output lines on the strips 31 and 32, bushings 39 are provided for receiving concentrically the plug connector. Accordingly, no wiring is required in a structure having a built-in cross-track distributor, for purposes of establishing the connection. Instead, the coaxial cables can be directly admitted to the cross-track distributor within the rack, after corresponding tensional release, and can be connected with the lines or conductors of the cross-track distributor through the coaxial connector and bushings 39, shown in FIG. 4.

It will be understood that each of the elements described above, or two or more together, may also find a useful application in other types of constructions differeing from the types described above.

While the invention has been illustrated and described as embodied in cross-track distributor for video signals, it is not intended to be limited to the details shown, since various modifications and structural changes may be made without departing in any way from the spirit of the present invention.

What is claimed as new and desired to be protected by Letters Patent is set forth in the appended claims:

1. A cross-track distributor for television signals, comprising, in combination, a group of input conductors receiving the input signals to said distributor; a group of output conductors for furnishing the output signals of said distributor; and a plurality of electronic switching means each connecting an associated one of said input conductors to an associated one of said output conductors when in a conductive state, each of said electronic switching means comprising a T network having a first, second and third diode, said first and second diodes constituting the longitudinal branch of said T network, said electronic switching means further comprising a first and second transistor decoupling stage connected, respectively, before said first and second diode in the direction of signal flow from said associated input to said associated output conductor.

2. The cross-track distributor as defined in claim 1 including voltage dividing means with tap connected to the center point of said T network.

3. The cross-track distributor as defined in claim 2 wherein one branch of said voltage dividing means comprises a first resistor, and the other branch of said voltage dividing means comprises a second resistor connected in series with a transistor.

4. The cross-track distributor as defined in claim 1 including a first transistor; a first terminal connected to one of said first group of conductors; a first transistor; a first resistor connected between said first terminal and the base of said first transistor; a first diode connected to the emitter of said first transistor; a second transistor; a second resistor connected between the base of said second transistor and said first diode; a second diode connected to the emitter of said second transistor; a second terminal connected to said second diode and to one of said second group of conductors; a third diode connected to the junction of said first diode and said second resistor; a third resistor connected between the collector of said first transistor and the junction of said first diode and said second resistor; a third transistor; a fourth resistor connected between the collector of said third transistor and the junction of said first diode and said second resistor; a third terminal for applying a control signal thereto; a fifth resistor connected between the base of said third transistor and said third terminal; an emitter-resistor connected to the emitter of said first transistor; and an emitter-resistor connected to the emitter of said second transistor.

5. A cross-track distributor as defined in claim 1, wherein said electronic switching means comprise integrated circuits.

6. A cross-track distributor as defined in claim 1, wherein said transistor decoupling stage and said additional transistor decoupling stage each comprise an emitter follower stage.

7. A cross-track distributor as defined in claim 1 including strip-shaped plates for carrying said group of input conductors and said group of output conductors; a base plate arranged perpendicular to the longitudinal edges of said strip-shaped plates, said strip-shaped plates for carrying said group of input conductors being arranged on one side of said base plate and said strip-shaped plate for carrying said group of output conductors being arranged on the other side of said base plate and perpendicular to the directions of said strip-shaped plates for carrying said group of input conductors, one of said strip-shaped plates carrying said switching means.

8. The cross-track distributor as defined in claim 7 wherein said first group of input conductors and said group of output conductors are in printed circuit form on said strip-shaped plates.

9. The cross-track distributor as defined in claim 8 including a further plate perpendicular to said base plate at oppositely lying edges of said base plate for carrying input amplifiers in printed circuit form.

10. The cross-track distributor as defined in claim 9 including output stages in said input amplifiers for impedance conversion, said output stages being arranged substantially at the center of said strip-shaped plate for carrying said group of input conductors.

11. The cross-track distributor as defined in claim 8 including strip-shaped plates for carrying the control lines for said switch means in printed cable harness form, said strip-shaped plates for said control lines being mounted perpendicular to said base plate and at the longitudinal edges of said base plate.

12. The cross-track distributor as defined in claim 8 including output amplifying means in printed circuit form and carried by said base plate on the side at which said plates for carrying said first group of conductors are arranged.

13. The cross-track distributor as defined in claim 1 wherein said group of input conductors and said second group of conductors comprises each twenty conductors within an enclosure of predetermined dimensions.

* * * * *